United States Patent
Varga et al.

(10) Patent No.: US 12,151,454 B2
(45) Date of Patent: Nov. 26, 2024

(54) COMPONENT WITH ELECTRICAL FUNCTIONAL ELEMENTS FOR THE PRODUCTION OF A LAMINATED SHEET

(71) Applicant: SAINT-GOBAIN GLASS FRANCE, Courbevoie (FR)

(72) Inventors: Gabor Varga, Herzogenrath (DE); Bastian Klauss, Herzogenrath (DE); Doane Shelby Craig, Aachen (DE); Christian Effertz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 726 days.

(21) Appl. No.: 17/278,971

(22) PCT Filed: Jun. 28, 2019

(86) PCT No.: PCT/EP2019/067276
§ 371 (c)(1),
(2) Date: Mar. 23, 2021

(87) PCT Pub. No.: WO2020/064158
PCT Pub. Date: Apr. 2, 2020

(65) Prior Publication Data
US 2022/0024185 A1  Jan. 27, 2022

(30) Foreign Application Priority Data

Sep. 25, 2018  (EP) ..................... 18196453

(51) Int. Cl.
*B32B 3/10* (2006.01)
*B32B 17/10* (2006.01)
(Continued)

(52) U.S. Cl.
CPC .. *B32B 17/10165* (2013.01); *B32B 17/10036* (2013.01); *B60J 1/001* (2013.01);
(Continued)

(58) Field of Classification Search
None
See application file for complete search history.

(56) References Cited

U.S. PATENT DOCUMENTS

| | | | |
|---|---|---|---|
| 4,703,237 A | 10/1987 | Hochstein | |
| 2002/0130676 A1* | 9/2002 | Beaman | G01R 1/0735 324/755.08 |

(Continued)

FOREIGN PATENT DOCUMENTS

| | | |
|---|---|---|
| CN | 101454943 A | 6/2009 |
| CN | 104228530 A | 12/2014 |

(Continued)

OTHER PUBLICATIONS

Machine translation of DE-102011018485-A1 (Year: 2012).*
(Continued)

*Primary Examiner* — Christopher M Polley
(74) *Attorney, Agent, or Firm* — Pillsbury Winthrop Shaw Pittman LLP

(57) ABSTRACT

A component for the production of a laminated sheet, includes at least two electrical functional elements and cabling, which includes electrical conductors having insulating sheathing and connected in each case to an electrical functional element, wherein the cabling has a bundling section, in which all the electrical conductors are surrounded by a common insulating sheathing.

11 Claims, 2 Drawing Sheets

Figure 1:
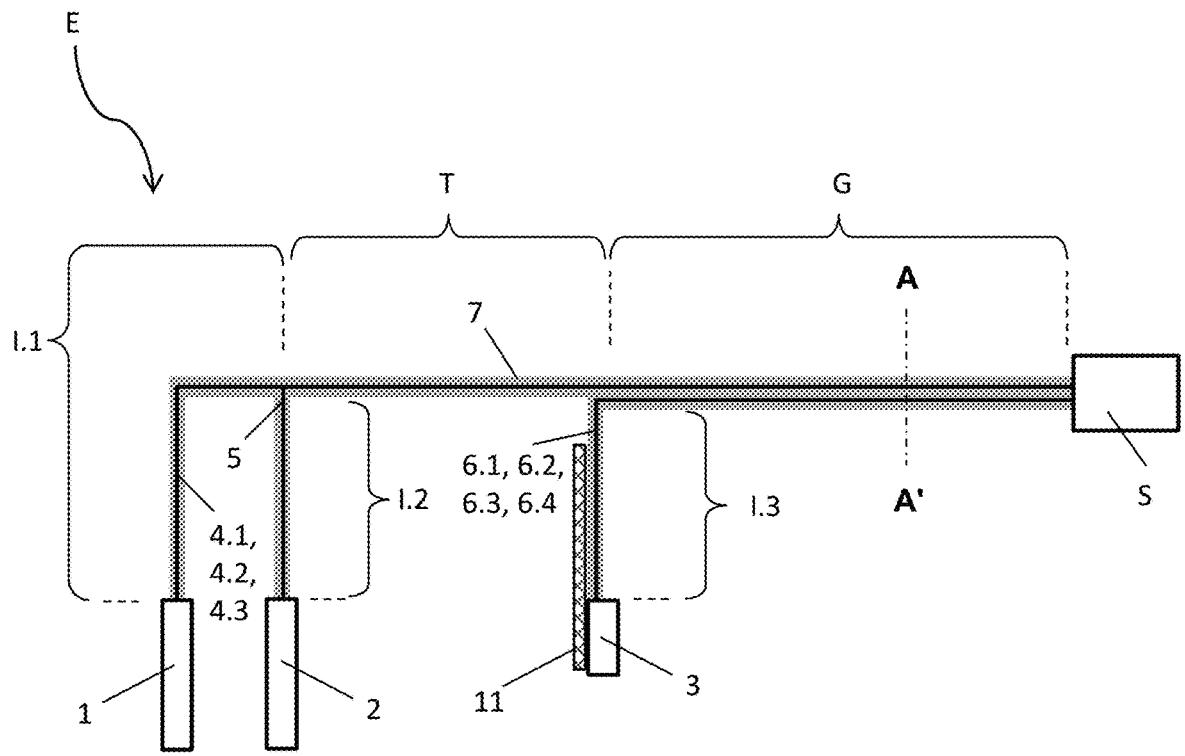

(51) Int. Cl.
   *B60J 1/00* (2006.01)
   *H01B 7/02* (2006.01)
   *B60S 1/08* (2006.01)

(52) U.S. Cl.
   CPC ............ *H01B 7/02* (2013.01); *B32B 2305/34* (2013.01); *B32B 2605/00* (2013.01); *B60S 1/0877* (2013.01)

(56) References Cited

U.S. PATENT DOCUMENTS

| | | | |
|---|---|---|---|
| 2009/0277671 | A1 | 11/2009 | Hahn |
| 2014/0374401 | A1* | 12/2014 | Nakagawa ............... B60J 10/70 156/305 |
| 2017/0144362 | A1 | 5/2017 | Nakayama et al. |
| 2018/0111356 | A1* | 4/2018 | Effertz .............. B32B 17/10788 |
| 2018/0207909 | A1 | 7/2018 | Vivier |

FOREIGN PATENT DOCUMENTS

| | | | | |
|---|---|---|---|---|
| CN | 204244214 U | 4/2015 | | |
| CN | 108271429 A | 7/2018 | | |
| DE | 197 46 526 A1 | 4/1999 | | |
| DE | 10 2006 000215 A1 | 11/2007 | | |
| DE | 10 2009 029602 A1 | 3/2011 | | |
| DE | 102011018485 A1 * | 3/2012 | ........... | G01D 11/245 |
| DE | 10 2016 013680 A1 | 5/2018 | | |
| EP | 2 100 722 A2 | 9/2009 | | |
| EP | 3 031 671 A1 | 6/2016 | | |
| JP | 2010-500703 A | 1/2010 | | |
| JP | 2015-003602 A | 1/2015 | | |
| JP | 2015-501063 A | 1/2015 | | |
| WO | WO 2013/053629 A1 | 4/2013 | | |
| WO | WO 2017/097536 A1 | 6/2017 | | |
| WO | WO-2017097537 A1 * | 6/2017 | ............ | B32B 17/10 |
| WO | WO 2017/203132 A1 | 11/2017 | | |
| WO | WO 2018/002723 A1 | 1/2018 | | |
| WO | WO 2018/077546 A1 | 5/2018 | | |

OTHER PUBLICATIONS

First Office Action as issued in Chinese Patent Application No. 201980002608.9, dated Feb. 23, 2024.

International Search Report as issued in International Patent Application No. PCT/EP2019/067276, dated Aug. 29, 2019.

* cited by examiner

COMPONENT WITH ELECTRICAL FUNCTIONAL ELEMENTS FOR THE PRODUCTION OF A LAMINATED SHEET

CROSS-REFERENCE TO RELATED APPLICATIONS

This application is the U.S. National Stage of PCT/EP2019/067276, filed Jun. 28, 2019, which in turn claims priority to European patent application number 18196453.7 filed Sep. 25, 2018. The content of these applications are incorporated herein by reference in their entireties.

The invention relates to a component for the production of a laminated sheet, a laminated sheet equipped therewith, and a method for producing a laminated sheet using the component.

Vehicle windows, in particular windshields, are increasingly being equipped with electrical functional elements. A windshield is implemented as a laminated sheet and consists of two glass panes joined to one another via a thermoplastic film. The electrical functional elements can either be laminated into the laminated sheet, i.e., be arranged between the two glass panes (internal functional elements), or attached to an outer surface of the laminated sheet (external functional elements). Examples of internal functional elements are light sensors for automatic control the vehicle lighting, capacitive rain sensors for automatic control of the windshield wipers or inward-directed LEDs as display elements. Examples of external functional elements are relative humidity or temperature sensors. Light sensors are described, for example, in EP2100722A2, WO2017097536A1, and WO2017097537A1; capacitive rain sensors, for example, in U.S. Pat. No. 4,703,237A, DE102006000215A1, and DE102009029602A1; integrated LEDs, for example, in WO2017203132A1, WO2018077546A1, and WO2018002723A1; relative humidity sensors, for example, in DE102011018485A1.

The production of vehicle windows is made considerably more complex by the Integration of electrical functional elements. When multiple functional elements are to be integrated, each individual functional element must typically be arranged manually in the intended position. The electrical supply lines of the functional elements, typically implemented as flat conductors, must be routed out as intended via the pane edge and subsequently connected individually to the on-board electrical system.

The object of the present invention is to provide a component having electrical functional elements, which simplifies the production of the laminated sheet, as well as a production method based thereon.

The object of the present invention is accomplished according to the invention by a component in accordance with claim 1. Preferred embodiments are disclosed by the dependent claims.

The component according to the invention is intended for the production of a laminated sheet. The component is, in particular, intended to be attached to the laminated sheet and/or embedded in the laminated sheet. The component according to the invention can also be referred to as a component for a laminated sheet, component of a laminated sheet, or component for attachment to and/or in a laminated sheet. The component includes at least two electrical functional elements. Each functional element is electrically conductively connected to one or a plurality of electrical conductors, which are provided for and suitable for electrically contacting the functional element and electrically connecting it to an external voltage source, a reference potential, an external evaluation electronics system, or the like. In the context of the invention, the entirety of the electrical conductors and their insulating sheathing are referred to as cabling.

According to the invention, the cabling of the component has a section in which all the electrical conductors of all functional elements are surrounded by common insulating sheathing. In context of the invention, this section is referred to as a "bundling section". The section with the common sheathing bundles, so to speak, all the electrical supply lines and the functional elements connected thereto such that, during production, only a single component has to be dealt with instead of a large number of components (each comprising a functional element and its supply line). In particular, the arrangement of the individual functional elements relative to one another can be selected under consideration of the pane and film thickness of the laminated sheet to be produced such that its intended positioning results automatically when the component is positioned at a side edge of the laminated sheet to be produced and each individual component does not have to be positioned in a complex manner. This considerably simplifies the production of the laminated sheet, constituting a major advantage of the present invention.

The laminated sheet to be produced is preferably a vehicle composite pane, particularly preferably a vehicle windshield, in particular, the windshield of a motor vehicle, for example, a passenger car, a truck, or a rail vehicle. However, in principle, the invention is also applicable to other vehicle windows, for example, roof panels, side windows, or rear windows, provided they are implemented as laminated sheets. Furthermore, the invention is applicable on laminated sheets in other sectors, for example, the construction, architecture, or interior sector.

A laminated sheet comprises a first and a second rigid pane, in particular, a glass pane, which are joined to one another via a thermoplastic intermediate layer. The thermoplastic intermediate layer is typically formed from an least one thermoplastic film. When the laminated sheet is provided as a window pane, such as, a vehicle windshield, and thus intended for separating an interior (vehicle interior) from an external environment, the two rigid panes can be referred to as an "outer pane" and an "inner pane". "Inner pane" refers to that pane that faces the interior in the installed position. "Outer pane" refers to that pane that faces the external environment in the installed position. The surface of the respective pane that faces the external environment in the installed position is referred to as the "exterior-side surface". The surface of the respective pane that faces the interior in the installed position is referred to as the "interior-side surface". The interior-side surface of the outer pane is joined to the exterior-side surface of the inner pane via the thermoplastic intermediate layer. Usually, the exterior-side surface of the outer pane is referred to as "side I"; the interior-side surface of the outer pane, as "side II"; the exterior-side surface of the inner pane, as "side III"; and the interior-side surface of the inner pane, as "side IV".

Starting from the bundling section of the component according to the invention having the common insulating sheathing, the supply lines of the individual functional elements branch off, so to speak. Connected directly to each functional element is a section in which the electrical conductor or conductors of said functional element are surrounded by their own insulating sheathing, which surrounds no electrical conductor(s) of the other functional elements. In the context of the invention, the sections of the cabling are referred to as "individual sections". These sections flow, so to speak, into the bundling section with the common sheathing, which bundles the functional elements with supply lines to form a single component and fixes the distances between the functional elements. Starting from the bundling section, the cabling is thus branched or fanned out in the direction of the functional elements, with an associated individual section arranged directly in front of each functional element.

If the component includes more than two functional elements, the supply lines can flow into the bundling section with the common sheathing, or the branching/fanning out of the supply lines can start from the bundling section, step-by-step in an advantageous embodiment. In this case, there is at least one section in which the electrical conductors of multiple, but not all, functional elements are combined by common sheathing. In the context of the invention, this section is referred to as a "partial bundling section" of the cabling. Starting from the bundling section, initially, the individual section of one functional element branches off, whereas the supply lines of the other functional elements in the partial bundling section initially continue to run in common insulating sheathing and are later branched into their individual sections. Starting from the bundling section, the cabling thus branches into the individual section of a functional element and a partial bundling section of the other functional elements. In other words, the bundling section in which all the electrical conductors are surrounded by common insulating sheathing is connected to the individual section of one functional element, in which the electrical conductor(s) of said functional element are surrounded by their own insulating sheathing that surrounds no electrical conductors of the other functional element(s), and a partial bundling section, in which the electrical conductors of the other functional elements are surrounded by common insulating sheathing.

The cabling thus includes a bundling section and an individual section for each functional element, with the individual sections connecting to the bundling section directly or via a partial bundling section.

All the functional elements and their respective electrical supply lines are preferably arranged on the same side of the section with the common insulating sheathing. If the component includes at least three functional elements, there is exactly one possibility for deploying the component in such a way that all individual sections of the other functional elements branch off from the same side from the connecting line between the bundling section with the common insulating sheathing of all the electrical conductors and a functional element, in particular the functional element the farthest away from it (i.e., the functional element with the longest supply line out of the individual section and any partial bundling sections). The functional elements can be numbered consecutively in the resultant order, beginning with the functional element that forms the endpoint of said connecting line. This order corresponds to the intended arrangement in the laminated sheet to be produced.

The component according to the invention preferably comprises at least one internal electrical functional element. In a particularly preferred embodiment, the component comprises at least one internal and at least one external electrical functional element. The term "an internal functional element" means a functional element that is intended for incorporation into the laminated sheet, i.e., is to be arranged between the individual panes of the laminated sheet and laminated into the composite. "An external functional element" means a functional element that is intended to be attached on the outside of the laminated sheet, i.e., on a surface of one of the individual panes facing away from the intermediate layer. It is precisely the combination of external and internal functional elements that makes the prior art production of the laminated sheets complex such that the present invention presents its advantages in a special way in this case.

If the component includes at least three functional elements, in a preferred embodiment, the middle or at least one of the middle functional elements according to the numbering described above is implemented as an electrical shielding element in order to avoid interference, coupling ("crosstalk"), or other disturbances between the external functional elements. The component preferably has at least two internal functional elements, including the shielding element, and at least one external functional element.

If the component includes at least three functional elements, including one external and a plurality of internal functional elements, starting preferably from the bundling section with the common insulating sheathing, the individual section of the external functional element branches off first, while the supply lines of the internal functional elements initially continue in a partial bundling section with the common insulating sheathing, and are later branched into the corresponding individual sections. In other words, the individual section of the external functional element connects to the bundling section and to external a partial bundling section of the internal functional elements. The order in accordance with the previously described numbering of the functional elements preferably corresponds to the arrangement of the functional elements in the laminated sheet to be produced in the direction from the outer pane to the inner pane, since external functional elements are typically attached to the interior-side surface. There, they are exposed to lower mechanical loads than on the exterior-side surface and can, for example, as sensors, deliver measured values on the condition in the interior.

In a particularly preferred embodiment, the component includes exactly three functional elements, namely one external functional element and two internal functional elements. In accordance with the above described numbering, the first functional element is an internal functional element and intended to be positioned nearest the outer pane of the laminated sheet, in particular between the outer pane and the thermoplastic intermediate layer. The second functional element is an internal functional element and is intended to be positioned between the inner pane and the thermoplastic intermediate layer. The third functional element is an external functional element and is intended to be attached on the outside of the inner pane of the laminated sheet.

Internal functional elements are fixed in the laminated sheet by the intermediate layer, whereas external functional elements have to be attached on the outside. In an advantageous embodiment, the external functional element and/or the individual section of the external functional element, in which the electrical conductor or conductors of the external electrical functional element are surrounded by their own insulating sheathing, which surrounds no electrical conductor(s) of the other functional elements, is provided with an adhesive. The adhesive can, for example, be implemented as a layer of an adhesive compound or as a double-sided adhesive tape. The adhesive is arranged on the side of the supply line section that faces the supply lines of the at least one internal functional element.

All the functional elements and their individual supply lines are preferably arranged on the same side of the section with the common insulating sheathing. On the other side of this section, the electrical conductors (more precisely, the ends of the conductors facing away from the functional elements) are preferably provided with an electrical plug connector ("female" coupling or "male" plug) for connection to an external electrical system, for example, the onboard electrical system of a vehicle. The electrical conductor(s) of the individual functional elements can be implemented in each case individually with one or a plurality of plug connectors. However, in a particularly advantageous embodiment, the electrical conductors of all the functional elements are connected to one common plug connector. Thus, the electrical connection to the external electrical system is made particularly simple. Of course, intermediate solutions are also conceivable, in which some of the functional elements are equipped with a common plug connector, whereas other functional elements have their own plug connectors.

The term "an electrical functional element" means, in the general sense, any element that is intended to be fastened in or on the laminated sheet and that can fulfill a function after electrical contacting with an external electrical element, in particular with a potential, a voltage source, or evaluation electronics. These are, in particular, sensors, transmitters, or receivers, in particular transmitters or receivers of electromagnetic radiation or sound waves, or electrical shielding elements. The functional elements are preferably rain sensors, light sensors, moisture sensors, temperature sensors, switch surfaces, light emitting diodes, image sensors, antennas, displays, heating elements, ultrasonic sensors, or electrical shielding elements.

Common examples of sensors, in particular as internal functional elements, are light sensors, capacitive rain sensors, and capacitive switch surfaces. A light sensor typically includes one or a plurality of photodiodes on a printed circuit board. They allow measurement of the ambient brightness, for example, to automatically control the vehicle lighting. Capacitive switch surfaces include a surface electrode or two electrodes nested together in a spiral, comb, or meander. Upon approach of the finger of an operator, the capacitance of the surface electrode against ground or the capacitance of the capacitor formed by the nested electrodes changes. This change in capacitance can be measured by evaluation electronics and converted into a switching signal. Similarly, a capacitive rain sensor measures the presence of raindrops on the laminated sheet, in order, for example, to automatically control the windshield wipers.

Common examples of sensors as external functional elements are moisture sensors, in particular relative humidity sensors, or temperature sensors.

Common examples of transmitters as internal or external functional elements are light emitting diodes, in particular LEDs or OLEDs, which serve, directed inward, as display elements or lighting.

Electrical shielding elements are typically metal foils or plates that are preferably connected externally to a reference potential and thereby grounded. Shielding elements are typically arranged between two additional functional elements in order to avoid interference or coupling between them.

In a particularly preferred embodiment, the component includes exactly three functional elements, namely one external functional element and two internal functional elements. In accordance with the above described numbering, the first two functional elements are internal functional elements and the third functional element is the external functional element. The second, internal functional element, arranged between the external and the other internal functional element, is implemented as an electrical shielding element. The electrical shielding element is in particular intended to be positioned between the inner pane and the thermoplastic intermediate layer. The first, internal functional element is, for example, implemented as a rain sensor or a light sensor and is intended to be positioned nearest the outer pane of the laminated sheet, in particular between the outer pane and the thermoplastic intermediate layer. The third, external functional element is, for example, implemented as a moisture or temperature sensor and is intended to be attached on the outside of the inner pane of the laminated sheet.

The electrical conductors of the functional elements are preferably implemented as so-called flat conductors or foil conductors, i.e., as strips of an electrically conductive foil, for example, copper foil, in particular tinned copper foil. Other electrically conductive materials that can be processed to form foils can also be used. Examples are aluminum, gold, silver, or tin and alloys thereof. The thickness of the flat conductors is typically from 0.03 mm to 0.2 mm and the width, for example, 2 mm to 60 mm. They are particularly suitable for internal functional elements, because, due to their small height, they can easily be guided out of the laminated sheet. However, in principle, other types of conductors can also be used, for example, round conductors such as stranded wire or solid wire conductors, in particular for external functional elements. It is also possible to connect a flat conductor to a round conductor to form an electrical conductor, with the flat conductor section connected to the (internal) functional element and intended to be laminated into the laminated sheet and to extend over its side edge.

The insulating sheathing around the electrical conductors is preferably formed from a polymeric material, although, alternatively, for example, ceramics or glass are conceivable. Suitable polymeric insulating materials are, for example, polyethylene, polyimide, polyvinyl chloride, polytetrafluoroethylene, polyesters, epoxy resins, polyurethane resins, or silicone elastomers. Typical thicknesses of the insulating sheathing are from 0.01 mm to 0.1 mm. In a preferred embodiment, the common insulating sheathing should have a thickness of at least 0.05 mm in the bundling region of the cabling. In addition to the electrical insulation, advantageous mechanically stable integrity of the component according to the invention is thus achieved. Here, "thickness" means the distance between the outer boundary of the sheathing and the nearest conductive structures within the cabling.

The electrical conductors of the component according to the invention are preferably completely surrounded by insulating sheathing. In the individual regions of the cabling, at least one electrical conductor of a functional element runs in insulating sheathing. If the functional element is connected to multiple conductors, which are preferably completely or largely implemented as flat conductors, the individual conductors can preferably run next to one another and/or above one another (based on the width of the foil strips). In a preferred embodiment, all the conductors of the same functional element run next to one another. The region between the individual conductors is preferably filled with the material of the insulating sheathing.

In the bundling region and in any partial bundling regions of the cabling, the electrical conductors of multiple functional elements run in common insulating sheathing. The conductors are preferably implemented completely or largely as flat conductors. In a preferred embodiment, all the conductors of the same functional element run next to one another (based on the width of the foil strips). The entirety of the conductors of various functional elements can run in one plane next to one another or above one another. In a preferred embodiment, electrical shielding is arranged between adjacent conductors of different functional elements, whether they run next to one another or above one another. The shielding can be implemented as electrically conductive foil strips, which are preferably provided for connecting to an electrical reference potential and, for this purpose, are provided with a plug connector. The region between the individual conductors is preferably filled with the material of the insulating sheathing.

If the region between individual conductors is filled with insulating material, this filling is preferably formed in one piece with the insulating sheathing. This applies to the individual regions, any partial bundling regions, and the bundling region.

Preferably arranged above and below the entirety of all the electrical conductors and any shields are an upper and a lower overall shield, preferably implemented as conductive foil strips or plates and also preferably provided for connecting to an electrical reference potential and, for this, provided with a plug connector.

The invention also includes a method for producing a laminated sheet, wherein
(a) a first pane, a second pane, at least one thermoplastic film, and a component according to the invention are provided,
(b) the first pane and the second pane with film therebetween are arranged flat atop one another to form a stack, wherein at least one electrical functional element of the component is arranged between the film and one of the panes and wherein the bundling section, in which all the electrical conductors are surrounded by common insulating sheathing, is arranged outside the stack,
(c) the first pane is joined to the second pane via the film by lamination to form the laminated sheet.

The thermoplastic film can be provided in one piece in order to form the entire thermoplastic intermediate layer of the laminated sheet. However, it is also possible to provide multiple film sections that are combined to form the intermediate layer. In this case, the functional elements of the component can be arranged around such a film section, which is subsequently inserted into the stack, for example, precisely fitting into a cutout of a remaining film. Said film section can also have a smaller thickness than the remaining film in order to compensate for the thickness of the functional elements.

In an advantageous embodiment, the electrical functional elements are arranged in the stack such that they overlap one another in the finished laminated sheet. This means that they are arranged one behind another at least partially congruently when looking through the laminated sheets. The supply lines of the functional elements are suitably dimensioned for this, i.e., the individual sections and any partial bundling sections of the cabling. The length of the individual sections and any partial bundling section are selected under consideration of the thicknesses of the components of the laminated sheet (individual panes and film) such that they run, as much as possible, without warping, wrinkling, and the like, directly to the bundling section when the functional elements are arranged at the intended place of use.

In an advantageous embodiment, the component includes one external functional element, which is attached to one of the surfaces of the first or the second pane facing away from the film, preferably to the interior-side surface of the inner pane. The attachment is preferably done with an adhesive, for example, a layer of an adhesive compound or a double-sided adhesive tape. The attachment can be done before or after lamination of the stack to form the laminated sheet. In addition to the external functional element, its individual section of the cabling can be attached to the pane surface with an adhesive.

In a preferred embodiment, the component includes at least two internal electrical functional elements for incorporation into the laminated sheet and at least one external electrical functional element for attachment on the outside of the laminated sheet. One internal functional element is arranged between the first pane and the film; one internal functional element, between the second pane and the film; and the external functional element, on the surface of the second pane facing away from the film, using an adhesive. The first pane is preferably the outer pane and the second pane the inner pane. The functional element between the second pane and the film is preferably implemented as an electrical shielding element for the electrical shielding of the other two functional elements.

The first and the second pane are preferably made of glass, particularly preferably soda lime glass, which has proven its value for window glass. However, the panes can also be made of other types of glass, for example, borosilicate glass or aluminosilicate glass. Alternatively, in principle, the panes can also be made of plastic, in particular polycarbonate (PC) or polymethyl methacrylate (PMMA).

The thickness of the panes can vary widely and thus be ideally adapted to the requirements in the individual case. Preferably, the thicknesses of the first and of the second pane are from 0.5 mm to 10 mm, particularly preferably from 1 mm to 5 mm, most particularly preferably from 1.2 to 3 mm.

The panes can be curved in one or more spatial directions, as is customary for motor vehicle windows, with typical radii of curvature in the range from approx. 10 cm to approx. 40 m. For this purpose, the two panes are preferably subjected to a bending process before lamination, for example, gravity bending, suction bending, and/or press bending. Typical bending temperatures are from 500° C. to 700° C.

The laminated sheet can have a peripheral masking print, as is customary for motor vehicle windows. Such a masking print can also be used to obscure or conceal the functional elements. Such an opaque masking print is applied on the edge region of at least one of the two panes, preferably both the panes. For this, a black or dark enamel is typically applied by screen printing and fired before lamination, in particular before bending or during bending.

The thermoplastic film, which is to form the intermediate layer of the laminated sheet, contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of a thermoplastic film is preferably from 0.2 mm to 2 mm, particularly preferably from 0.3 mm to 1 mm, for example, 0.76 mm. The intermediate layer can be formed from multiple thermoplastic films arranged one atop another, with the possibility of positioning the functional elements between two such films.

The panes and the thermoplastic film can be, independently of one another, clear and colourless, but also tinted, frosted, or coloured. In a preferred embodiment, the total transmittance through the laminated sheet is greater than 70%, in particular when the laminated sheet is a windshield. The term "total transmittance" is based on the method specified by ECE-R 43, Annex 3, § 9.1 for testing the light permeability of motor vehicle windows. The panes can be made of non-tempered, partially tempered, or tempered glass.

The lamination of the panes to form the laminated sheet is done with customary methods known per se to the person skilled in the art, for example, autoclave methods, vacuum bag methods, vacuum ring methods, calender methods, vacuum laminators, or combinations thereof. The bonding of the first and the second pane is usually done under the action of heat, vacuum, and/or pressure.

The invention also includes a laminated sheet, equipped with a component according to the invention or a laminated sheet that can be produced using the method according to the invention. Preferably, at least one functional element is arranged between the individual panes. In a particularly preferred embodiment, a first functional element is attached between the first pane (preferably the outer pane) and the thermoplastic intermediate layer; a second functional element, between the second pane (preferably the inner pane) and the thermoplastic intermediate layer; and a third functional element, on the outside of the second pane. The second functional element is preferably an electrical shielding element for decoupling the other two functional elements.

in the following, the invention is explained in greater detail with reference to drawings and exemplary embodiments. The drawings are a schematic representation and not to scale. The drawings in no way restrict the invention.

Figure 2:
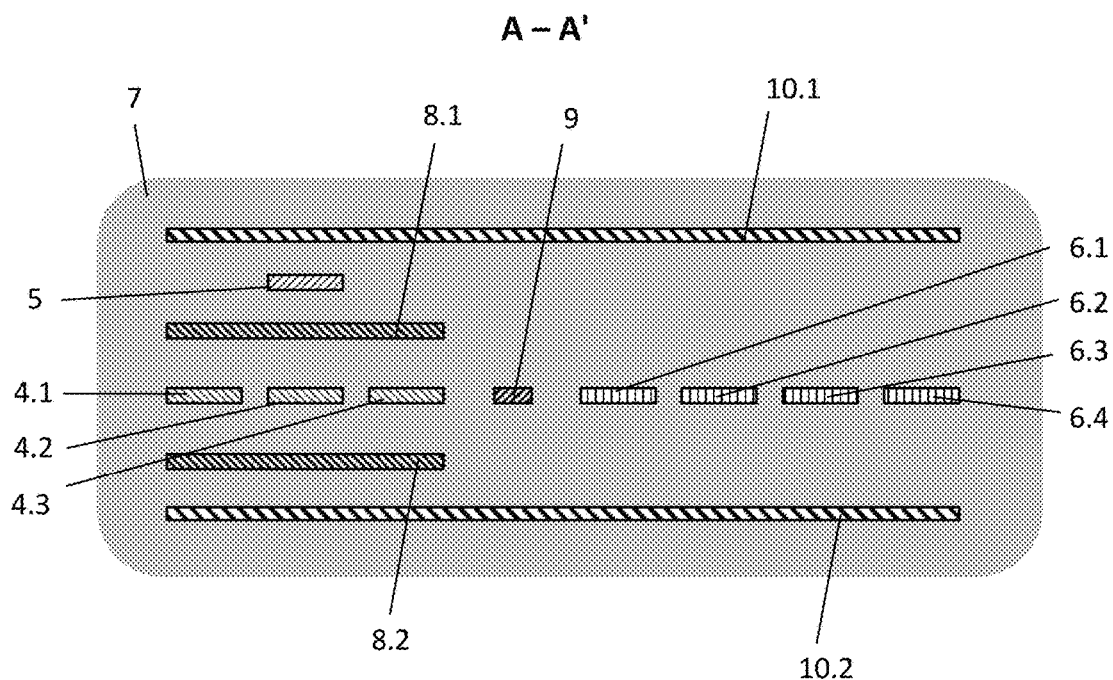
Figure 3:
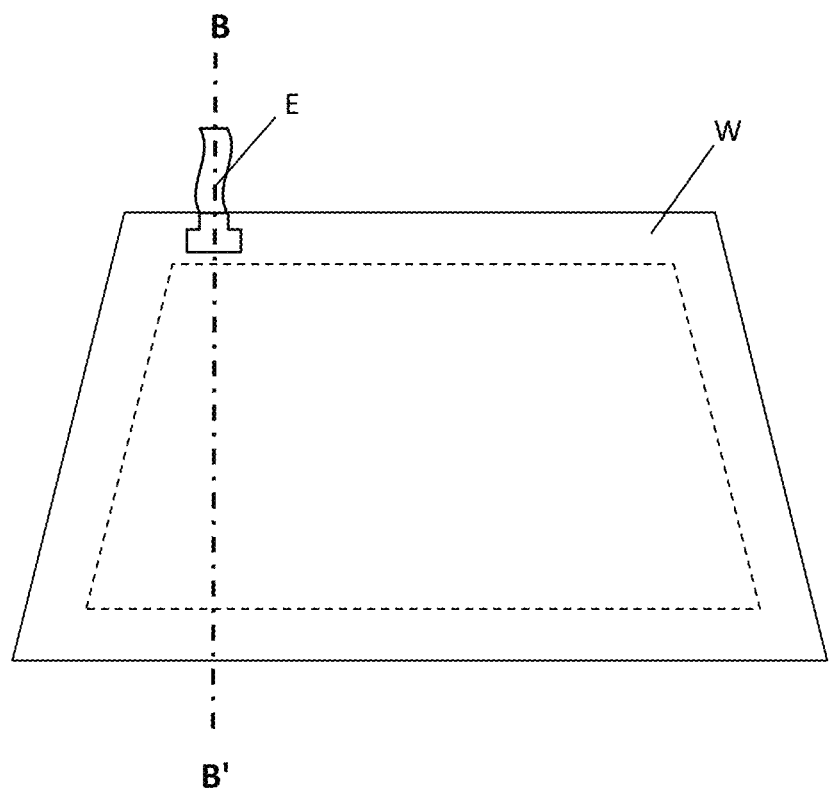
Figure 4:
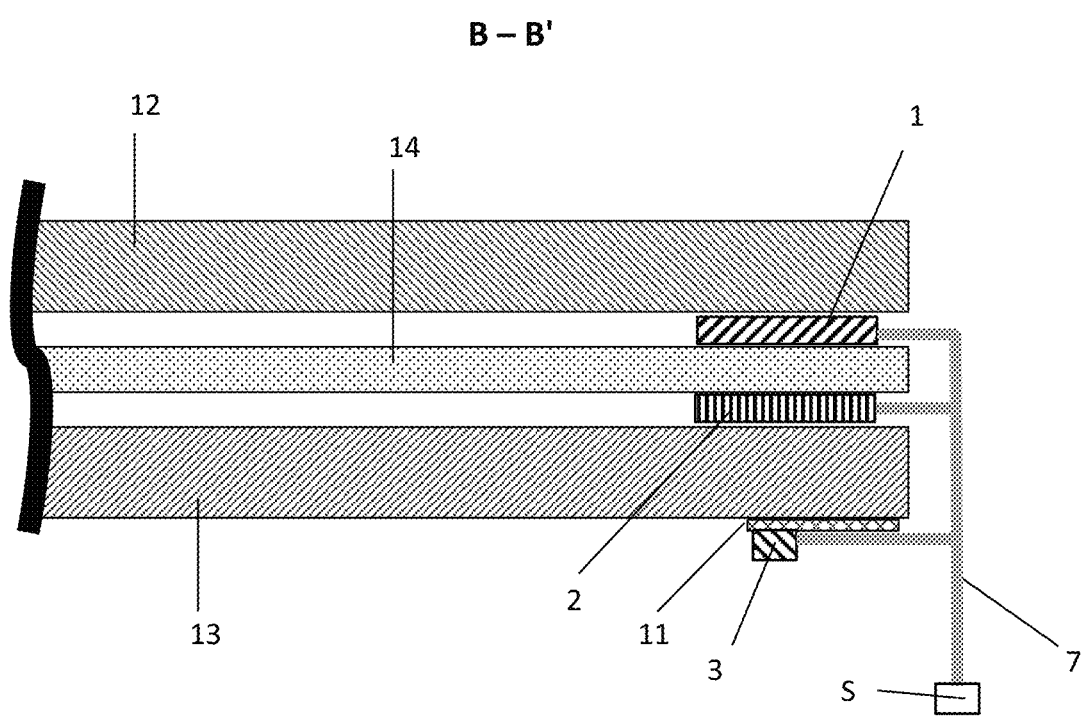

They depict:

FIG. 1 a plan view of an embodiment of the component according to the invention, FIG. 2 a cross-section along A-A' through the component of FIG. 1, FIG. 3 a plan view of a laminated sheet equipped with a component according to the invention, and FIG. 4 a cross-section along B-B' through the laminated sheet of FIG. 3.

FIG. 1 depicts a schematic representation of an embodiment of the component E according to the invention for manufacturing a laminated sheet, in particular a windshield for a motor vehicle. The component includes three electrical functional elements 1, 2, 3. The first electrical functional element 1 is a capacitive rain sensor and is intended to be laminated as an internal functional element between the outer pane and the thermoplastic intermediate layer of a laminated sheet. The second functional element 2 is an electrical shielding element and is intended to be laminated as an internal functional element between the inner pane and the thermoplastic intermediate layer of the laminated sheet. The third functional element 3 is a moisture sensor and is provided to be attached as an external functional element on the interior-side surface of the inner pane. The second functional element 2 is intended, as a shielding element, to prevent interference, couplings ("crosstalk") and other disturbances between the other two functional elements 1, 3.

In addition to the functional elements 1, 2, 3, the component includes cabling, comprising the electrical conductors connected to the functional elements 1, 2, 3 and their insulating sheathing 7. Three conductors 4.1, 4.2, 4.3 are connected to the first functional element 1; one conductor 5 is connected to the second functional element 2; and four conductors 6.1, 6.2, 6.3, 6.4 are connected to the third functional element 3. The conductors 4.1, 4.2, 4.3; 5; 6.1, 6.2, 6.3, 6.4 are formed from strips of a tinned copper foil as flat conductors.

The cabling of the component E is divided into various sections. It comprises a so-called bundling section G, in which the conductors 4.1, 4.2, 4.3; 5; 6.1, 6.2, 6.3, 6.4 of all the functional elements 1, 2, 3 are surrounded by common insulating sheathing 7. The bundling section G bundles, so to speak, the three functional elements 1, 2, 3 with their associated conductors 4.1, 4.2, 4.3; 5; 6.1, 6.2, 6.3, 6.4 to form a single component E. At the end of the bundling section G facing away from the functional elements 1, 2, 3, the conductors 4.1, 4.2, 4.3; 5; 6.1, 6.2, 6.3, 6.4 are equipped with a common plug connector S, with which the entire component E can be connected to the onboard electronic system of the vehicle.

Starting from the bundling section G, the cabling is branched into a so-called individual section I.3 of the third functional element 3 and a so-called partial bundling section T of the first and second functional element 1, 2. In the individual section I.3, only the conductors 6.1, 6.2, 6.3, 6.4 of the third functional element 3 are contained with insulating sheathing 7. The third functional element 3 is connected to the individual section I.3. In the partial bundling section T, the conductors 4.1, 4.2, 4.3, 5 of the first and second functional element 1, 2 are contained in common insulating sheathing 7. At the end of the partial bundling section T, the cabling is again branched into an individual section I.2 of the second functional element 2 and an individual section I.1 of the first functional element 1. In the individual section I.1, only the conductors 4.1, 4.2, 4.3 of the first functional element 1 are contained; and in the individual section I.2, only the conductor 5 of the second functional element 2, in each case with insulating sheathing 7.

The third functional element 3 and its individual section I.3 are provided with an adhesive 11 for easy attachment to the laminated sheet. As a result of the bundling of the three functional elements 1, 2, 3 to form a single component E, the production of the laminated sheet is substantially simplified. It is no longer necessary to position the functional elements individually in the composite and to attach them. Instead, only one component E, whose individual sections I.1, I.2, I.3 and whose partial bundling section T determine the arrangement of the functional elements 1, 2, 3 relative to one another, has to be dealt with. The individual sections I.1, I.2, I.3 and the partial bundling section T are dimensioned such that the functional elements 1, 2, 3 overlap in the laminated sheet, i.e., are arranged congruently.

FIG. 2 depicts a cross-section through the bundling section G of the component of FIG. 1. The electrical conductors 4.1, 4.2, 4.3 of the first functional element 1 are arranged in one plane next to one another (based on the width dimension of the plat conductor). Likewise, the electrical conductors 6.1, 6.2, 6.3, 6.4 of the third functional element 3 are arranged next to one another in one plane. The entirety of the conductors 4.1, 4.2, 4.3 and the entirety of the conductors 6.1, 6.2, 6.3, 6.4 are also arranged next to one another in the same plane. Arranged between the conductors 4.1, 4.2, 4.3, on the one hand, and the conductors 6.1, 6.2, 6.3, 6.4, on the other, is a shielding 9, which decouples the conductor groups.

The conductor 5 serves to ground the second functional element 2. It is arranged in a different plane above the conductors 4.1, 4.2, 4.3. Arranged between the conductor 5, on the one hand, and the conductors 4.1, 4.2, 4.3 is a shielding 8.1 for decoupling. A shielding 8.2 is also arranged below the conductors 4.1, 4.2, 4.3. The shieldings 8.1, 8.2 extend over the entire width of the conductors 4.1, 4.2, 4.3. The shieldings 8.1, 8.2 are preferably grounded via the plug connector S. The shielding 9 is preferably also grounded, either via the plug connector S as well or through a connection to the shieldings 8.1, 8.2 (not shown).

Arranged above and below the entirety of all the electrical conductors 4.1, 4.2, 4.3; 5; 6.1, 6.2, 6.3, 6.4 and the internal shieldings 8.1, 8.2, 9 are overall shieldings 10.1, 10.2, which extend over the total width of the conductors 4.1, 4.2, 4.3; 5; 6.1, 6.2, 6.3, 6.4 and internal shieldings 8.1, 8.2, 9. The overall shieldings 10.1, 10.2 serve for decoupling from external influences and are, in turn, preferably grounded via the plug connector S. All conductors and shieldings are encased in polymeric material that forms the insulating sheathing 7 and fills the intermediate spaces.

FIG. 3 depicts a laminated sheet W with the component E. The laminated sheet W is intended as a windshield of a motor vehicle and the component E is arranged outside the central field of vision, which is indicated by a dashed line. With the first functional element 1 (rain sensor), the presence of drops of water on the outer pane can be measured in order to automatically begin operation of the windshield wipers as a function thereof. With the third functional element 3 (moisture sensor), the relative humidity in the vehicle interior can be measured and, for example, the automatic climate control system can be adjusted thereto.

FIG. 4 depicts a cross-section through the laminated sheet W of FIG. 3. The laminated sheet W comprises an outer pane 12, an inner pane 13, and a thermoplastic film 14 arranged therebetween. For the sake of clarity, the components are shown spaced apart from one another such that the figure represents the layer stack before lamination rather than the finished windshield. The outer pane 12 and the inner pane 13 are made of soda lime glass and have a thickness of, for example, 2.1 mm. The film 14 is made of a plasticiser-containing PVB with a thickness of 0.76 mm.

The first functional element 1 is arranged between the outer pane 12 and the film 14; the second functional element 13, between the inner pane 13 and the film 14; and the third functional element 3, on the interior-side surface of inner pane 13 facing away from the outer pane 12 via the adhesive 11. The functional elements 1, 2, 3 are arranged overlappingly such that they are arranged in congruence when looking through the laminated sheet W.

LIST OF REFERENCE CHARACTERS (E) component for the production of a laminated sheet
(1) first electrical functional element
(2) second electrical functional element
(3) third electrical functional element
(4.1), (4.2), (4.3) electrical conductors of the first electrical functional element 1
(5) electrical conductor of the second electrical functional element 2
(6.1), (6.2), (6.3), (6.4) electrical conductors of the third electrical functional element 3
(7) insulating sheathing
(8.1), (8.2) shielding between electrical conductors of different planes
(9) shielding between electrical conductors of the same plane
(10.1), (10.2) upper and lower overall shields
(11) adhesive
(G) bundling section of the cabling
(T) partial bundling section of the cabling
(1.1) individual section of the functional element 1
(1.2) individual section of the functional element 2
(1.3) individual section of the functional element 3
(S) plug connector
(W) laminated sheet
(12) first pane
(13) second pane
(14) thermoplastic film
A-A' section line
B-B' section line

The invention claimed is:

1. A laminated sheet, comprising:
a first pane and a second pane that are connected together via a thermoplastic film arranged between the first and the second pane, and
a component that comprises at least two electrical functional elements and cabling, which comprises electrical conductors having insulating sheathing and connected in each case to an electrical functional element,
wherein the cabling has a bundling section, in which all the electrical conductors are surrounded by common insulating sheathing,
wherein at least one of the at least two electrical functional elements is arranged between the thermoplastic film and one of the first and second panes, and
wherein the bundling section of the cabling is arranged outside the laminated sheet.

2. The laminated sheet according to claim 1, wherein the component further comprises at least one external electrical functional element for external attachment to the laminated sheet.

3. The laminated sheet according to claim 1, wherein the cabling includes, for each electrical functional element, an associated individual section, which is connected to the respective electrical functional element and in which the electrical conductor(s) of said functional element are surrounded by their own insulating sheathing, which surrounds no electrical conductor(s) of the other functional element(s).

4. The laminated sheet according to claim 3, wherein the component comprises at least three electrical functional elements, wherein the individual section of a functional element is connected to the bundling section and a partial bundling section, in which the electrical conductors of the other functional elements are surrounded by common insulating sheathing.

5. The laminated sheet according to claim 3, wherein the component further comprises at least one external electrical functional element for external attachment to the laminated sheet and wherein the external electrical functional element and/or the individual section of the external electrical functional element is provided with an adhesive.

6. The laminated sheet according to claim 1, wherein ends of the conductors facing away from the functional elements are connected to at least one plug connector.

7. The laminated sheet according to claim 1, wherein the electrical functional elements are implemented as sensors, transmitters, or electrical shielding elements.

8. The laminated sheet according to claim 1, wherein the electrical conductors are implemented at least partially as flat conductors.

9. The laminated sheet according to claim 1, wherein the cabling also includes electrical shields for decoupling the electrical conductors of various functional elements.

10. The laminated sheet according to claim 6, wherein ends of the conductors facing away from the functional elements are connected to a single common plug connector.

11. The laminated sheet according to claim 7, wherein the electrical functional elements are implemented as rain sensors, light sensors, relative humidity sensors, temperature sensors, switch surfaces, light emitting diodes, image sensors, antennas, displays, heating elements, ultrasonic sensors, or electrical shielding elements.

* * * * *